United States Patent
Arbus

(10) Patent No.: US 11,054,543 B2
(45) Date of Patent: Jul. 6, 2021

(54) SYSTEM AND METHOD FOR WELL CYBERSTEERING

(71) Applicant: DEVON ENERGY CORPORATION, Oklahoma City, OK (US)

(72) Inventor: Tristan Arbus, Warr Acres, OK (US)

(73) Assignee: Devon Energy Corporation, Oklahoma City, OK (US)

( * ) Notice: Subject to any disclaimer, the term of this patent is extended or adjusted under 35 U.S.C. 154(b) by 263 days.

(21) Appl. No.: 16/149,452

(22) Filed: Oct. 2, 2018

(65) Prior Publication Data

US 2019/0302307 A1 Oct. 3, 2019

Related U.S. Application Data

(60) Provisional application No. 62/649,199, filed on Mar. 28, 2018.

(51) Int. Cl.
*G01V 5/06* (2006.01)
*E21B 7/04* (2006.01)
*E21B 44/00* (2006.01)

(52) U.S. Cl.
CPC ............... *G01V 5/06* (2013.01); *E21B 7/046* (2013.01); *E21B 44/00* (2013.01)

(58) Field of Classification Search
CPC ........... G01V 5/06; E21B 7/046; E21B 44/00; E21B 7/10
See application file for complete search history.

(56) References Cited

U.S. PATENT DOCUMENTS

| | | | |
|---|---|---|---|
| 2006/0090934 A1* | 5/2006 | Williams | E21B 7/04 175/45 |
| 2015/0134255 A1* | 5/2015 | Zhang | G01V 99/005 702/7 |
| 2016/0041302 A1 | 2/2016 | Priezzhev et al. | |
| 2017/0081953 A1* | 3/2017 | Benson | E21B 47/022 |
| 2017/0306750 A1* | 10/2017 | Carpenter | G01V 11/002 |
| 2018/0106133 A1* | 4/2018 | Bolchover | E21B 41/0092 |

OTHER PUBLICATIONS (M. S. Stoner, "Technical Geosteering Finds the Sweet Spot", E&P Magazine, Nov. 2007, pp. 71-77 (Year: 2007).*
Arnold, Tom, The Art and Science of Geosteering; Presentation Slides.

* cited by examiner

*Primary Examiner* — Alexander Satanovsky
*Assistant Examiner* — Douglas Kay
(74) *Attorney, Agent, or Firm* — Crowe & Dunlevy, P.C.

(57) ABSTRACT

There is provided herein a system and method for automatically determining a path within a target rock unit of a directionally drilled well (a target well) using log readings, e.g., gamma log readings, taken in the target well as compared with log readings (a typelog) taken in a well that penetrates the target rock unit (an offset well). Most specifically, in some embodiments the path of the target well within the target rock unit will be obtained by solving a minimum travel distance problem which uses distances that are based on differences between well log readings in the target and offset wells. Solution of this problem will yield a collection of stratigraphic blocks lengths and dips that define a path of a well in a subsurface through the target formation or rock unit.

15 Claims, 4 Drawing Sheets

SYSTEM AND METHOD FOR WELL CYBERSTEERING

CROSS REFERENCE TO RELATED APPLICATIONS

This application claims the benefit of U.S. Provisional Patent Application Ser. No. 62/649,199, filed Mar. 28, 2018, titled "SYSTEM AND METHOD FOR WELL CYBERSTEERING", the entire disclosure of which is incorporated herein by reference as if fully set out at this point.

TECHNICAL FIELD

This disclosure relates generally to production of hydrocarbons and, in more particular, systems and methods for determining the stratigraphic location of a directionally drilled well.

BACKGROUND

Geosteering refers to the systems and methods for controlling a wellbore based on the results of downhole geological measurements. One aspect of this technology involves the determination of the current position and trajectory in a directionally drilled well during the drilling process in order to provide insight to directional personnel. Another closely related aspect involves the determination of the path of a completed wellbore within a producing formation after it has been drilled. Both approaches will be considered "geosteering" for purposes of the instant disclosure. This sort of determination is typically not necessary for vertically drilled wells but becomes needed and often essential in wells that are horizontally or directionally drilled. Note that for purposes of the instant disclosure, when the terms "horizontal" or "horizontally drilled" or "directionally drilled" well are used those terms should be broadly construed to apply to any well that has a path that significantly deviates from vertical.

The objective of geosteering is usually to keep a directional wellbore within a hydrocarbon pay zone defined in terms of its resistivity, density or even biostratigraphy. In mature areas, geosteering may be used to keep a wellbore in a particular section of a reservoir to minimize gas or water breakthrough and maximize economic production from the well.

Geosteering techniques are used to adjust the planned borehole position or direction (inclination and azimuth angles) during drilling to cause the borehole to reach one or more geological targets. These adjustments can be made based on geological information gathered while drilling. Rotary steerable systems when used in conjunction with modern geophysical tools have provided an increased ability to reach the target formation which may be many thousands of feet below ground. One popular tool configuration has directional and inclination sensors, along with a gamma ray tool that is used to collect gamma ray data. Other logging tools might also be included in the configuration.

Of particular importance to geosteering efforts are readings from a gamma log that is taken in the well that is being drilled (the wellbore gamma log or just gamma log, hereinafter) in order to determine the stratigraphic depth or the position of the borehole within the target producing formation. Those of ordinary skill in the art will recognize that a gamma log, or "gamma ray log" is obtained using a downhole tool that measures naturally occurring gamma radiation emitted from the rock units. It is well known that different rock types emit different amounts of radiation which provides a means for identifying lithologic units in the subsurface using data collected using this log (e.g., shales emit more radiation than do other sedimentary rocks). The tool that collects these readings typically provides radiation measurements every ½ foot as it is pulled through the well bore. Some gamma logs differentiate the information collected based on the element that decays (e.g., K, U, and Th count rates might be separately recorded rather than just total gamma ray count).

The gamma log in the well is compared with the one taken in an offset well in order to determine where the wellbore sits within the target formation, the "typelog" hereinafter. For purposes of the instant disclosure, the rock unit(s) that is the target of the horizontal well will be referred to hereinafter as the "target formation" or "target unit" or just "target", hereinafter.

Unfortunately, today the correlation between a directed well and the offset well is largely manually performed, albeit with some computer assistance in some cases. The general process requires a geosteerer review the gamma and trajectory data every time a survey comes in and reassess their strat block (i.e., stratigraphic block) choices and gamma log matches by manually manipulating strat block lengths and angles to try to get a fit between the target well log and the typelog. This is mostly done by stretching and shifting the strat blocks length and angles on screen using the mouse while try to visually match gamma traces. The problems with this approach are clear and include, e.g., inconsistent solutions between different geosteerers, subjective bias, etc.

Thus, what is needed is a system and method of automatically determining the location of a directionally drilled borehole using downhole measurements related to lithology and/or stratigraphy such as gamma ray logs.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to one embodiment, there is provided herein a system and method for automatically determining a path of a directionally drilled well (the target well) within a target rock unit using gamma log readings taken in the target well as compared with gamma log readings from in an offset well (the typelog) that penetrates the target rock unit. More specifically, in some cybersteering embodiments the path of the target well within the target formation will be obtained by solving a minimum travel distance problem which uses distances that are based on differences between well log readings in the two wells. Solution of this problem will yield a collection of stratigraphic blocks lengths and dips (strat blocks) that defines the path of the well in the subsurface through the target formation or rock unit.

In more particular and according to one variation, the problem to be solved is represented as a two-dimensional matrix of nodes, where each node corresponds to an end point of a strat block. The distance between two nodes is calculated using the differences between the typelog gamma readings and the gamma log readings in the target well that have been collected between the locations that correspond to the two selected nodes. Changing the angle or length of a strat block changes the wellbore's stratigraphic path and thereby changes how the gamma traces correlate and overlay with the type log. A numerical algorithm is used to find the collection of strat blocks that represent the minimum distance between the starting point and the ending point in the target well.

For purposes of the instant disclosure, the target formation will be assumed to have a constant thickness that matches its thickness in the offset well as defined by the typelog. Each strat block will have a length and slope that is defined by linear segments between different nodes in the matrix, where the line segments that define the strat blocks will be selected so as to minimize the travel path through the matrix. In some embodiments, the distance between nodes will be the Euclidian distance between a well log constructed using gamma log data from the target well as compared with the gamma log from the typelog.

In some embodiments of the instant cybersteering methodology, each column in the matrix represents a different point along the path of the target well, i.e., a different measured distance along the target wellbore (MD) as that term is known and used in the geosteering arts. In some embodiments, the nodes in each column will be separated by a MD of 30 feet. The rows of the matrix will correspond to different trial values of relative stratigraphic depths (RSD) which will be used to define the slopes of the strat blocks as discussed below.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION

Figure 1:
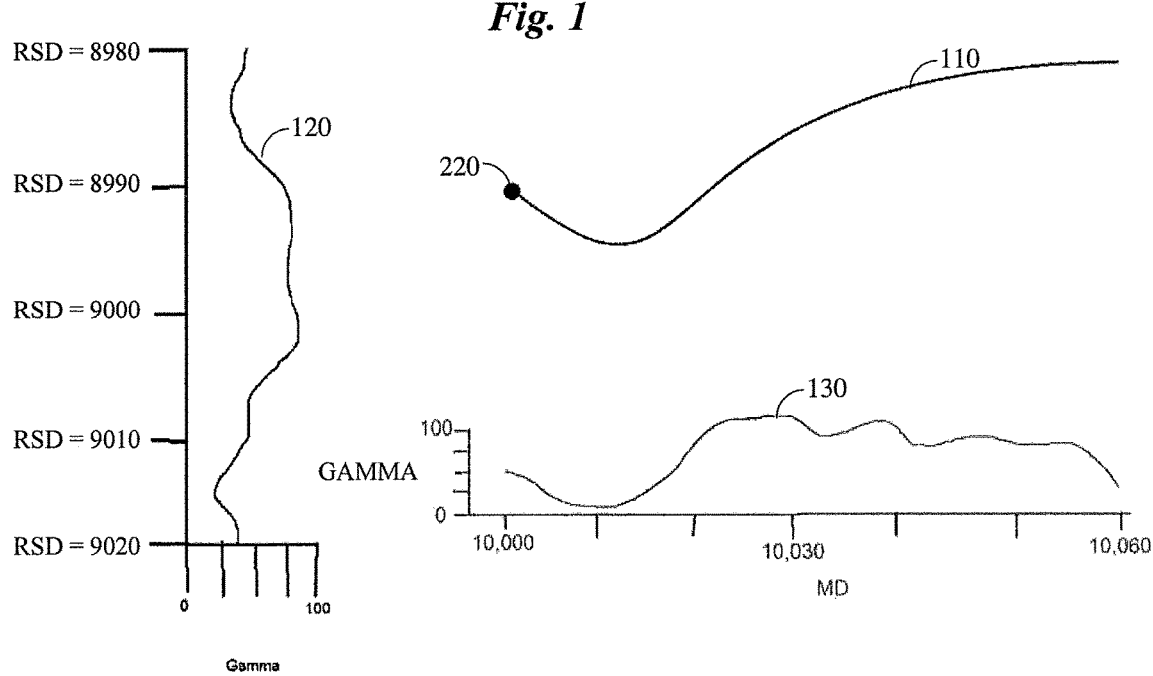
FIG. 1 contains a schematic illustration of known quantities that are useful in some embodiments.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Geosteerers take the gamma readings from a well that is currently being drilled (the wellbore gamma) and correlate them to an offset typelog (the typelog gamma), i.e. known gamma readings from a nearby wellbore, in order to determine their current stratigraphic depth, or their current position within the rock layers (gamma is obtained from a tool run behind the bit and is indicative of rock composition). For purposes of the instant disclosure, the discussion that follows be focused on the lateral portion of a directional wellbore, i.e., the portion of the well that is deeper in measured depth than the landing point ("LP") as that term is used in the art where the well has substantially completed its turn toward horizontal.

Turning to a discussion of an embodiment, one goal is to determine the strat block configurations (e.g., length and dip) that best matches the typelog/gamma log. Various embodiments consider every possible strat block length and dip, evaluate the quality of the gamma match for each one, then determine the ideal connected solution from the start to the end of the lateral, i.e., the horizontal section of a directionally drilled well.

FIG. 1 illustrates some of the quantities that are generally assumed to be known for purposes of an embodiment of the instant method. The well path 110 is assumed to be known. It is typically measured and controlled in the field by the directional drilling company. In some embodiments, a survey will be taken, usually once every stand (e.g., once about every 90') to determine the location of the well bore. Each survey contains information such as current direction (inclination and azimuth) and position. These are then considered to be known positions of the wellbore in 3D space, which is often visualized in 2D and might be plotted on a total vertical depth (TVD) vs measured depth (MD) scale. That is, TVD is the distance straight down from surface, whereas MD is the overall length of the wellbore.

The gamma readings in the offset well (i.e., the typelog 120) are assumed to be known. The location of the landing point 220 (LP in FIG. 2) is also assumed to be known. The gamma readings along the length of the target well 130 are likewise assumed to be known. The locations (endpoints/length) and dip of the strat blocks are not known and represent quantities that are to be estimated via the instant method.

Note that although the well might exist in 3-D space, it will be assumed for purposes of this embodiment that it has been reduced to a 2-D problem by projecting it onto a vertical plane. In some embodiments the vertical plane might curve somewhat to follow the wellbore, but that typically does not impact the solution significantly. In some cases, a survey is taken every 90 feet that determines the well's position in 3D space. The location of the wellbore between the survey points is typically obtained by interpolation and estimated every ½ foot. One interpolation approach that has been useful is the minimum curvature method. By projecting the interpolated well path into 2-D, the problem may be reduced to two dimensional. The further assumption is usually made that the beds of interest are of constant thickness and are generally following the wellbore.

Figure 2:
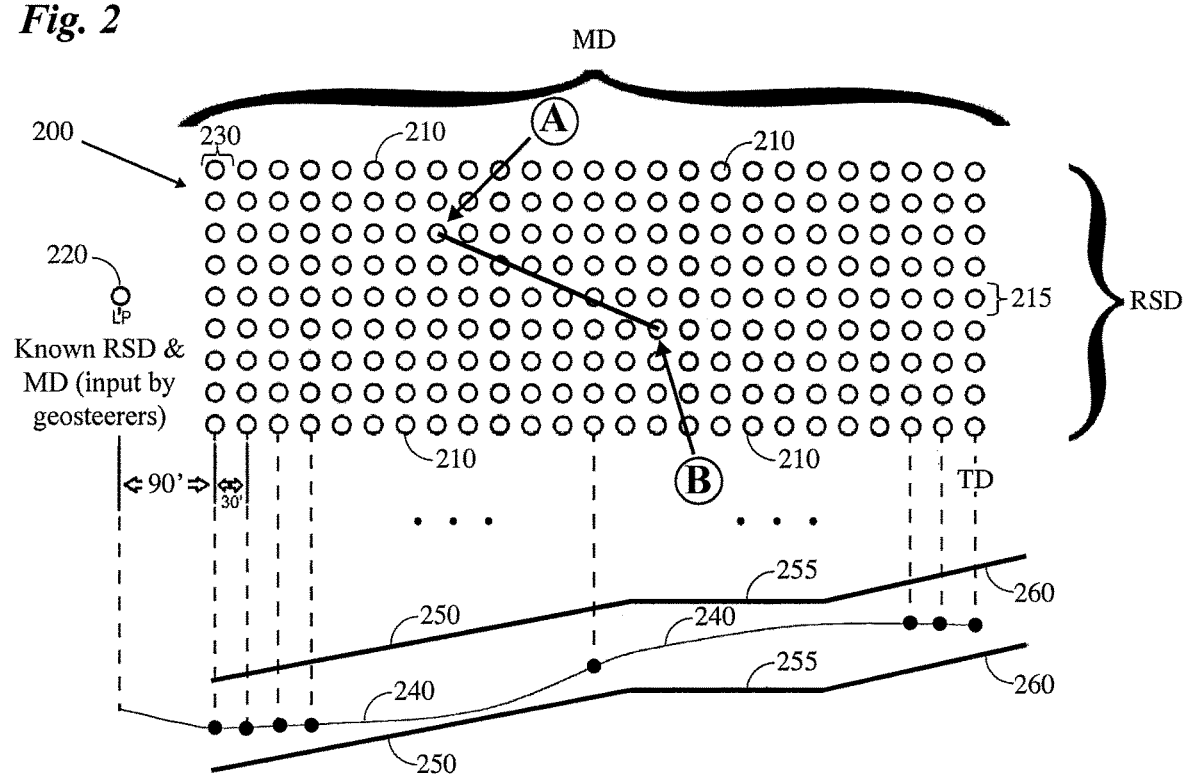
FIG. 2 illustrates how the array of nodes relates to the target wellbore.

FIG. 2 contains an embodiment of the two-dimensional matrix that can be utilized to determine an optimum or near optimum solution to the problem at issue. As can be seen, there are a plurality of nodes 210 that are arranged for convenience into a generally rectangular array 200 of nodes 210. The array 200 is indexed laterally by MD, the measured distance along the wellbore path, and RSD, i.e., the relative stratigraphic depth. Additionally, note the presence of the LP 220 (landing point) which is at a point higher in the directionally drilled well as described previously. Note that generally speaking the MD of each node in the array will be assumed to be known quantities.

Continuing with FIG. 2, in this particular embodiment rows and columns of the matrix consists of nodes that will be utilized in the calculation as follows. Note that in this particular example, the LP is separated by 90' (MD) from the nodes in first column 230. As such, each of the nodes in the first column 230 is assumed to be at a distance of 90' from the LP. Further, and continuing with the present example, each successive column is assumed to be situated an additional 30' from the column to its left, although, clearly, both of those values merely represent examples that those of ordinary skill in the art will be readily able to modify depending on the needs of a specific situation.

Beneath the array 200 is a schematic illustration of a wellbore 240 that is shown moving within three adjacent linear strat blocks 250, 255, and 260 calculated according to an embodiment. Within the offset well the RSD of the typelog will often be more or less the same as the TVD since the typelog will be assumed in most cases to be drawn from a well that is substantially vertical over the interval of interest, although other variations are certainly possible. As the well bore extends horizontally, the TVD will be assumed to be known from the surveys, but the RSD will need to be determined based on typelog matching as discussed below. The MD of each column of the matrix is a known quantity.

As will be discussed more fully below, a "distance" will be computed between every node pair in the array 200, optionally subject to certain limitations also discussed below. This distance in this embodiment will be a function of the difference between the gamma log in the target well and that of the typelog and this difference will be used to determine a minimum travel path through the array which then represents the best-fit collection of strat blocks that contain the well path. One approach to calculating the distance between two nodes is discussed below.

Figure 3:
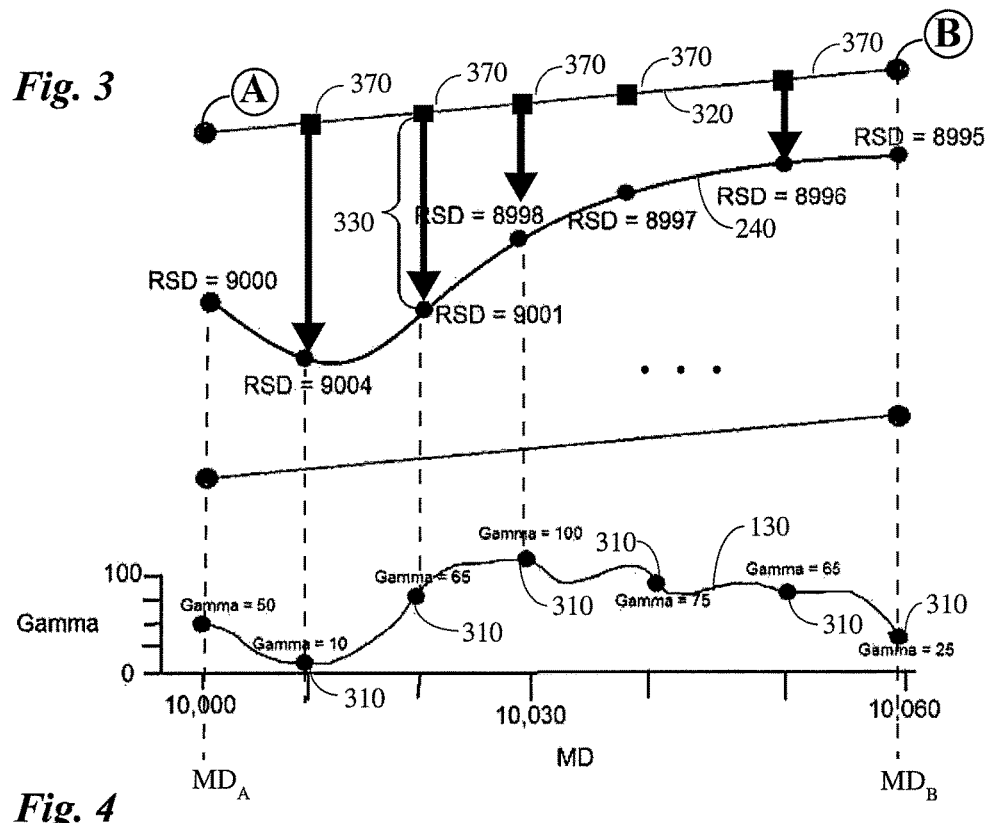
FIG. 3 contains an example of how the gamma log values and RSD values might be determined for the trial strat block AB.
Figure 4:
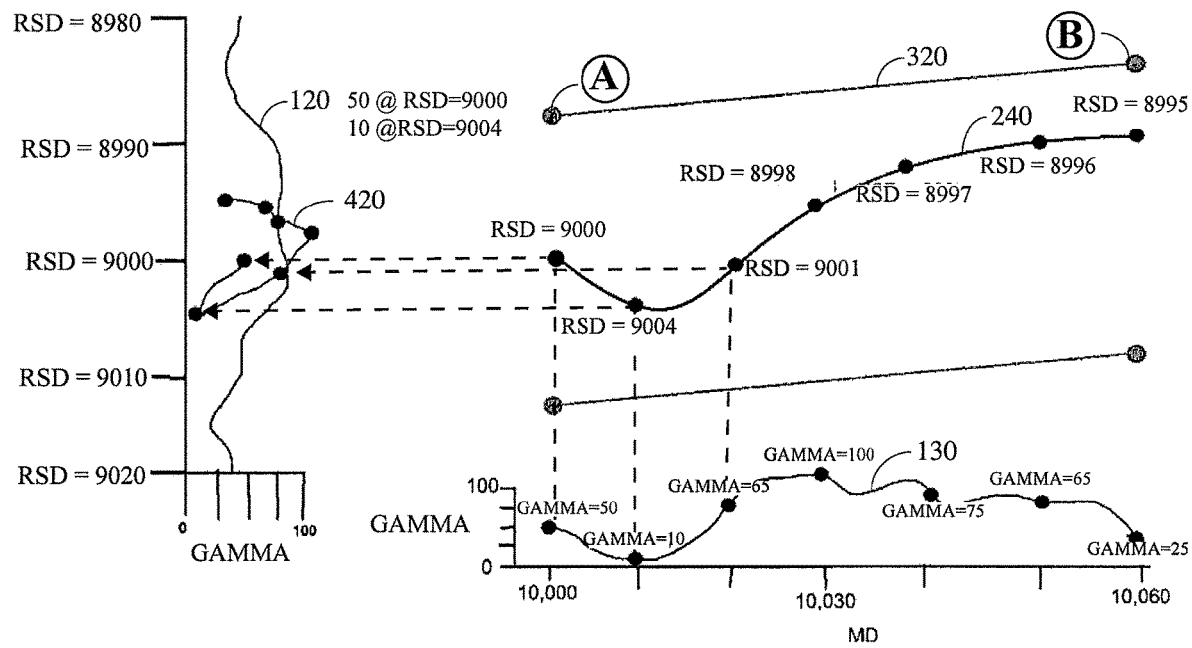
FIG. 4 illustrates how the gamma log values from the directionally drilled well together with the RSD values might be used to construct a gamma curve according to one embodiment.

Let A and B be two nodes selected from the matrix 200 (FIG. 2), $MD_A$ being the MD corresponding to node A and $MD_B$ being the MD corresponding to node B. Between the two selected nodes an associated gamma log will be constructed using log values between $MD_A$ and $MD_B$ in the target well. One approach for doing this is illustrated in FIGS. 3 and 4. In FIG. 3, gamma values 310 from the gamma log that has been taken along the length of the target well will be extracted at "n" points between the locations of the two nodes A and B. This produces a collection of gamma values G(i), i=1, n.

Each row 215 of nodes will be assigned a trial RSD value, with the RSD value for each row being, for example, five feet apart in depth. Thus, and as a specific example, if the RSD at the LP 220 is 9000' deep, the trial RSD's of the rows might be 9000', 9000'±5', 9000'±10', 9000'±15', etc. This arrangement effectively assigns an X coordinate (MD) and a Y coordinate (RSD) to each node A and B. These coordinates can then be used to calculate the slope of the line segment 320 that connects the selected nodes and, ultimately, the distance between nodes A and B.

Continuing with the example of FIG. 3, a trial RSD of the wellbore will be computed for each of the "n" points 370 along the segment defined by A and B. This quantity will be, in this example, the vertical distance between the calculated line 320 that connects points A and B and the wellbore 240 (e.g., vertical distance 330) added to the RSD of the connecting line at the same point. This computation will result in a number of depths, D(i), i=1,n, which represent the RSD at each intermediate point between A and B. The RSD information will be assumed to be a known quantity that is provided by the drillers.

Figure 5:
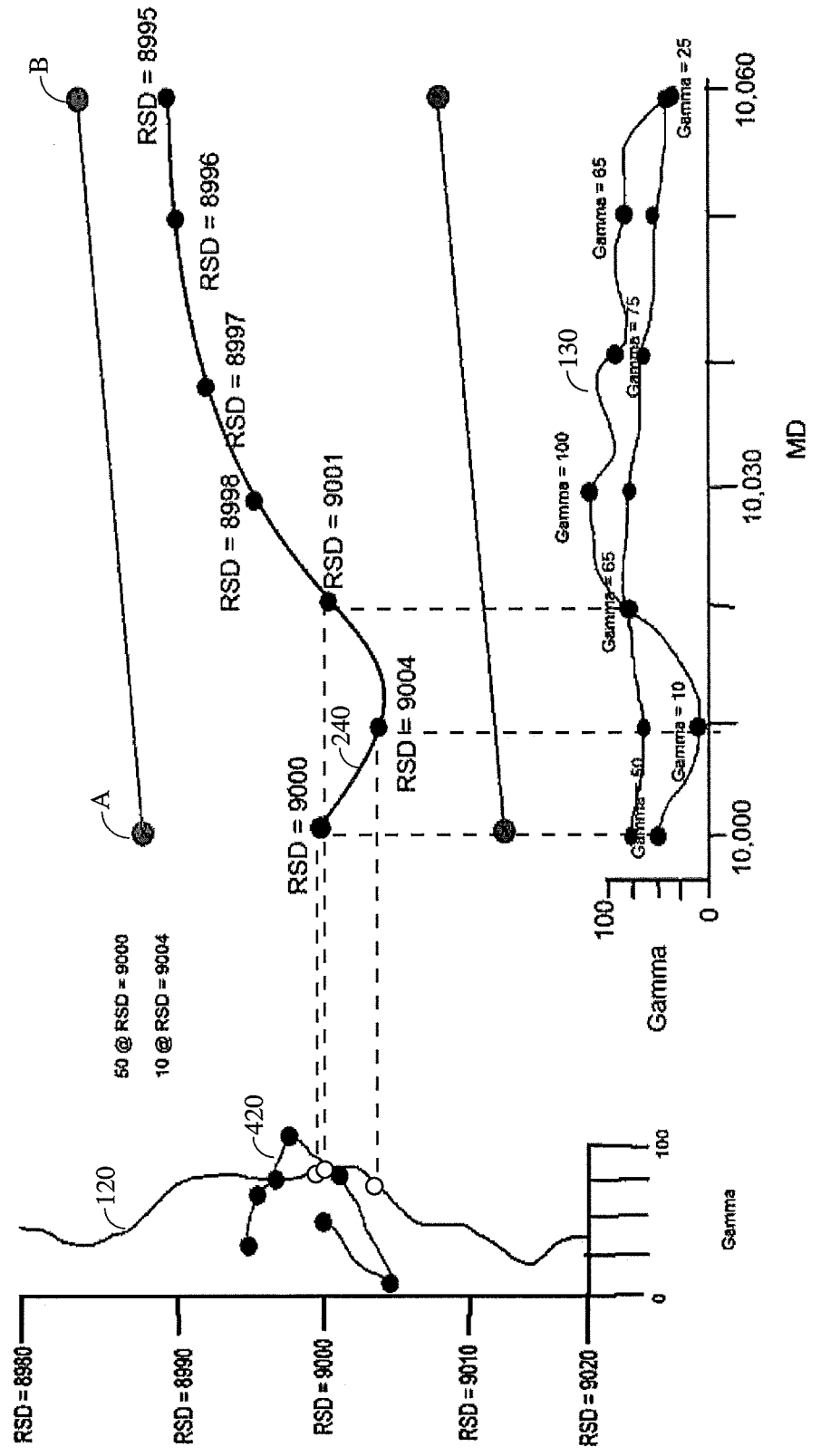
FIG. 5 shows how the example constructed gamma curve of FIG. 4 might be combined with data values from the typelog.

Turning now to FIG. 4, given the data pairs (G(i), D(i)) a trial gamma log section 420 can be constructed for the interval AB. In this figure, the log segment 420 has been plotted on top of the illustrated portion of the typelog 120 to make it easier to compare the two curves. It should be clear that each point on the log segment 420 can be directly compared with a corresponding point on the typelog 120. To the extent that there is an approximate match between the typelog 120 gamma values and those of the log segment 420 that would indicate that the slope of AB accurately reflects the slope of the target unit over that interval. Similarly, to the extent that the two curves are significantly different, that would indicate that AB does not correspond to the slope of the unit in that interval. For purpose of comparison, FIG. 5 shows the same log data with values of the typelog 120 plotted on top of the data gamma log 130 from the target well within the interval under consideration.

Given the foregoing, it should be clear that a metric such as the Euclidian distance between the values of the typelog 120 and the those of the log segment 420 would be one possible measure of the similarity between the two logs 120 and 130. For example, if T(i),i=1,n, represents the values of the typelog at the same depths as the gamma values G(i), the Euclidean distance between nodes A and B would be:

$$D_{AB} = \sqrt{\sum_{i=1}^{n}(G(i)-T(i))^2}.$$

Note that in some embodiments the (G(i), T(i)) pairs will be separated by ½ foot as measured by the MD. Of course, any such metric could be used (e.g., sum of absolute values, median of the absolute value differences, etc.). In some embodiments, the instant inventor has determined that the following modification of the distance calculation is useful in some contexts:

$$D_{AB} = \left(\sum_{i=1}^{n}(G(i)-T(i))^2\right)^{0.98}.$$

That is, although it might be more customary to use the first formulation above (square root), this would tend to increase the cost/distance of longer strat blocks (e.g., more values would be squared and added together since the parameter "n" could be larger for longer segments). Thus, it would be advantageous in some instances to actually favor longer strat blocks, hence the second variation above might be preferred. Of course, the power of the exponent (e.g., 0.98) might need to be made larger or smaller in some circumstances and those of ordinary skill in the art would readily understand when this would be beneficial. Similarly, $D_{AB}$ might be divided by "n" or some other value related to the length of the line segment AB. Of course, measures such as the sum of the absolute value of the differences could also be used.

As such, given the approach above for calculating the distance between any two nodes in the array, it should be clear that the instant approach can be reduced to a minimum travel path problem through the matrix. In some embodiments, the minimum travel path will be obtained using Dijkstra's algorithm. Of course, those of ordinary skill in the art will recognize that this is only one of a number of well-known algorithms for solving this sort of problem. Further, in some instances it might be useful to calculate weighted distances between nodes, with the weights determined according to some independent criterion (e.g., rules of thumb, heuristic rules, imprecise knowledge, regional dip, information from other wells concerning the target formation, etc.).

One preference of the current embodiment is that that adjacent strat blocks must form a continuous curve, i.e., the ending point of one strat block must coincide with the starting point of the next one. That being said, if there is a known fault in the target unit that would introduce a discontinuity in the solution, the fault could be eliminated by artificially flattening the target wellbore path to eliminate the fault, separately solving for travel paths on each side of the fault, etc. Another approach would be to allow travel between nodes within the same column but this option would significantly complicate the computation. If travel between nodes in the same column were allowed it might be necessary to increase the cost of such a path. Those of ordinary skill in the art will readily be able to device other means for accommodating this sort of discontinuity in the subsurface.

Figure 6:
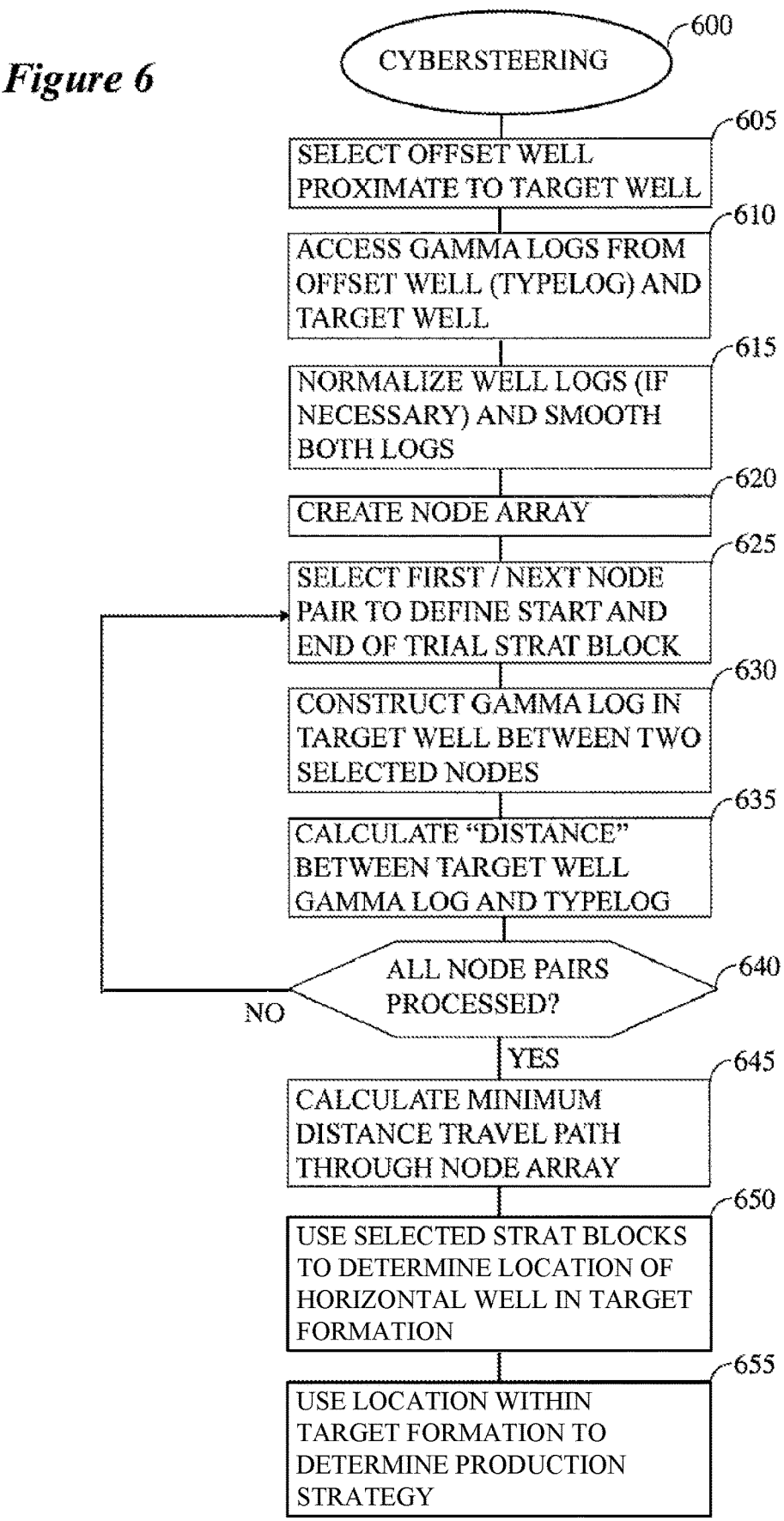
FIG. 6 contains an operating logic suitable for use with an embodiment.

By way of summary and as is generally indicated in FIG. 6, the following represents a condensed statement of one approach to solving the instant cybersteering problem (box 600). After the offset well and target well have been selected (box 605), one operating logic suitable for use with an embodiment would proceed as follows:

(a) Obtain a typelog from the offset well and a log from the target well (box 610). Preferably both will be gamma logs. The gamma values for both the typelog and the well log may need to be normalized (box 615).
  i. As an example, because they have been measured with different tools or different calibrations, etc., gamma readings in the two wells can be slightly misaligned. These readings can be normalized by, for example, using statistical methods (e.g., to have the same average or median value, or to be within the same predetermined range) or by using the manual (visual) normalization often performed by the geosteerers. Other methods of normalization are also certainly possible.

(b) Numerically smooth the two well logs in the offset and target wells (box 615).
  i. In practice, care should be taken to not remove too much of the character of the log out of the two traces. The logs should be smoothed enough to remove or attenuate the noise, but not so much as to remove information. Smoothing is currently done in one embodiment via a Savitzky-Golay filter.

(c) Create an array of nodes as described previously (box 620). Note that for purposes of this step in this embodiment, the LP/landing point can qualify as a node.

(d) Select two nodes (box 625). These two nodes define starting and ending points for a trial strat block.

(e) Construct a trial gamma log in the target well between the two chosen nodes (box 630), where said trial well log is constructed from well log values. Although this might be done in many ways, some embodiments utilize the following approach:
  i. Each node in the node array is assigned a trial RSD value and an MD value. In some cases the nodes will be chosen to be about 5' apart as measured by the RSD.
  ii. Each node in the array is associated with an MD value.
  iii. The RSD values associated with the nodes between the two selected nodes are used to extract gamma log values from the type log that are at the same RSD.
  iv. A trial gamma log is constructed between the two selected nodes using the extracted gamma log values (box 630)

(f) Determine the "distance" between the two nodes as measured by the difference between the trial gamma log and the well gamma log (box 635).
  i. One approach to obtaining this distance would be to evaluate the sum of squared differences between the constructed gamma log of the target well and the actual gamma log in that well. This computation will result in a numerical value that representative of the difference between the type log and the well gamma log. Preferably the calculation will be incremented at half foot intervals as measured by the MD.
  ii. Take the squared sum of the calculated difference to the 0.98 power. Normally, in statistics, the square root of the result is taken. However, this could potentially increase the cost/distance of longer strat blocks as explained previously. Instead, it might be desirable to slightly favor longer strat blocks, so the 0.98 power is taken instead.
  iii. The resulting numerical value will represent the distance between these two nodes for purposes of the steps that follow.

(g) Perform steps (d) through (f) for every combination of node pairs in the array except for those that are excluded, if any (see below), to obtain an array of edge distances from each node to all of the others (box 640). In some embodiments not every pair distance in the array will be used. Examples of the sorts of criteria that might be used to exclude certain pairs from the calculation are:
  i. In some embodiments, the two selected nodes will be required to be at least 90' MD apart and the distance between two nodes may not be longer than 3000' MD.
  ii. Also, the slope of the connecting line segment between two nodes is currently limited to a slope of no more than 18' of RSD for every 100' in MD. Obviously, these constraints are just examples and other variations are certainly possible.

(h) Calculate the minimum distance travel path through the array given the calculated edge distances (box 645). There are many different approaches to calculating the minimum travel path those an array of edge distances and those of ordinary skill in the art will readily be able to select one in a given instance. That being said, Dijkstra's algorithm has proven to be useful in some situations.

(i) Use the chosen strat blocks that represent the minimum travel path to identify the path of the horizontal well within the target formation (box 655).

(j) Once the path as defined by the minimum travel path strat block combination has been identified, it has numerous uses. In the case of a well that is currently being drilled, the well's stratigraphic path can be used to form a steering plan that recommends how the trajectory of the well should be steered, e.g., up or down, to stay within the target formation. Staying within the target formation will improve the ability to produce oil and/or gas from the target well. In the case of a well that has already been drilled, the stratigraphic path can be used to aid the design of a completions plan or operation so that the well may be most efficiently produced, e.g. by fracking. It can also be used to provide area knowledge for the planning of future wells. Either approach can readily be implemented by those of ordinary skill in the art, given the calculated path within the target formation.

Those of ordinary skill in the art will recognize that at least steps (c) through (h) must be performed in a computer. As such, as a general matter when the term "computer" is used herein, that term should be broadly construed to include any active device including, without limitation, a processing unit, a field programmable gate array, discrete analog circuitry, digital circuitry, an application specific integrated circuit, a digital signal processor, a reduced instruction set computer, devices with multicore CPUs, etc. The foregoing also includes distributed or parallel processing systems where multiple computers contribute to a final solution. In brief, all is required is that the computer be minimally programmable in some sense and capable of accepting input of the sort described above. The computer can some amount of local internal memory (e.g., volatile and/or non-volatile memory devices) and storage, and potentially have access to memory or storage that is connectable to it via a network. The computer may access a computer application program that implements various aspects of an embodiment and is stored in non-volatile internal memory, or stored in an external memory that can be connected to the computer via an input/output (I/O) port. The computer program application may include code or executable instructions that when executed may instruct or cause the central controller and other components to perform steps or functions embodying methods disclosed herein.

Additionally, it is contemplated some sort of display device will typically be accessible to the user so that the results of the calculations may be viewed. Of course, the display might take the form of a printed report, but in most cases the user will use a video display of some sort. The display might take place on the computer's directly attached graphical display or, more generally, on any display device suitable for presenting graphical and text information to a user. Display devices such as table computers, smart phones, smart terminals, etc., could also be used. In the event that the computational load of the optimization calculation is too much for the display device, the computations could be done remotely and communicated via a network (e.g., wired or wireless Ethernet, Bluetooth, WiFi, a web-based program executed over the Internet, etc.) from the computational computer to the display device.

Finally, it should be noted and remembered that although the gamma log was used as an example other logs, combinations of logs, etc., are certainly possible. For example, the gamma log might be mathematically combined with one or more other well logs to yield a functional value useful in the determination of the RSD. Further, other individual well logs (e.g., resistivity, spontaneous potential, sonic, density, etc.), mathematical functions of those wells logs, combinations of well logs (e.g., sonic and density logs could be used to compute acoustic impedance), or mathematical functions of combinations of well logs could all potentially be used instead of the gamma log in the determination of "distances" between nodes.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method for steering a target an active well as it is drilled through a target formation, the method comprising the steps of:
   (a) selecting an offset well nearby to the target formation;
   (b) accessing an offset well log taken in said offset well and a target well log taken in said target well, said target well log being acquired in a target well bore associated with said target well;
   (c) creating a node array comprised of a plurality of rows and columns of nodes, each of said nodes being assigned an RSD and a MD depending on its row and column in said node array, wherein said assigned RSD is a relative stratigraphic depth in said target formation and said MD is a measured distance along said target well bore;
   (d) selecting a starting node and an ending node from among said plurality of nodes, said starting node having a starting RSD and a starting MD, and said ending node having an ending RSD and an ending MD, said starting node and ending node defining a strat block;
   (e) using said starting MD and said ending MD to obtain a plurality of target RSD values from said target well bore, said plurality of target RSD values being obtained between said starting MD and said ending MD in said target well bore, each of said target RSD values being associated with a target well log value;
   (f) using said plurality of target RSD values to obtain a corresponding plurality of offset well log values from said offset well;
   (g) calculating a value representative of a difference between said plurality of target well log values and said plurality of offset well log values, thereby calculating a distance between said starting node and said ending node;
   (h) performing at least steps (d) through (g) until a plurality of distance values between a corresponding plurality of different starting and ending nodes has been calculated;
   (i) using said plurality of distances to determine a minimum distance travel path through said plurality of different starting and ending nodes, said minimum distance travel path comprising a plurality of selected nodes in said node array, thereby determining a corresponding plurality of strat blocks;
   (j) using said plurality of strat blocks to determine the path within the target formation traveled by the target well bore;
   (k) forming a steering plan for the target active well based on the path determined in step (j); and
   (l) controlling the trajectory of the target well to stay within the target formation according to the steering plan.

2. The method according to claim 1, wherein said offset well log and said target well log are both gamma logs.

3. The method according to claim 1, wherein step (b) comprises the steps of:
   (b1) accessing an offset well log from said offset well and a target well log from said target well, said target well log being acquired from a target well bore associated with said target well, and
   (b2) numerically smoothing at least a portion of said offset well log and said target well log from said target well.

4. The method according to claim 1, wherein step (b) comprises the steps of:
   (b1) accessing an offset well log taken in said offset well and a target well log taken in said target well, said target well log being acquired in a target well bore associated with said target well, and
   (b2) normalizing said offset well log and said target well log.

5. The method according to claim 1, wherein step (g) comprises the step of:
   (g1) calculating a value representative of a difference between said plurality of target well log values and said plurality of offset well log values, thereby calculating a distance between said starting node and said ending node, wherein said value is calculated according to the equation $$D_{AB} = \sqrt{\sum_{i=1}^{n} (G(i) - T(i))^2},$$

where $D_{AB}$ is said value,
$G(i)$ is said plurality of offset well log values,
n is a number of said $G(i)$ values, and,
$T(i)$ is said number of said type log values.

6. The method according to claim 1, wherein step (g) comprises the step of:
   (g1) calculating a value representative of a difference between said plurality of target well log values and said plurality of offset well log values, thereby calculating a distance between said starting node and said ending node, wherein said value is calculated according to the equation $$D_{AB} = \left(\sum_{i=1}^{n}(G(i)-T(i))^2\right)^{0.98},$$

where $D_{AB}$ is said value,

G(i) is said plurality of offset well log values, n is a number of said G(i) values, and, T(i) is said number of said type log values.

7. The method according to claim 1, wherein step (i) comprises the step of:
 (i1) using said plurality of distances to determine a minimum distance travel path through said plurality of different starting and ending nodes, said minimum distance travel path comprising a plurality of selected nodes in said node array, thereby determining a corresponding plurality of strat blocks, wherein said minimum distance travel path is determined using Dijkstra's algorithm.

8. The method according to claim 1, further comprising the step of:
 (k) using the calculated path of the horizontal well through the target formation to design a production plan.

9. The method according to claim 8, wherein said production plan is a steering plan if the horizontally drilled well is not completed or a completion plan if the horizontally drilled well is completed.

10. A method for producing a steering plan based on the determination of a path within a target formation traveled by a horizontally drilled well having a target wellbore using a computer, comprising the steps of:
 (a) within a computer performing the steps of:
  (i) accessing a typelog taken in an offset well;
  (ii) accessing a target well log taken in the target well bore;
  (iii) creating a node array comprised of a plurality of rows and columns of nodes, each of said nodes being assigned an RSD and a MD depending on its row and column in said node array, wherein said assigned RSD is a relative stratigraphic depth in said target formation and said MD is a measured distance along said target wellbore;
  (iv) selecting a starting node and an ending node from among said plurality of nodes, said starting node having a starting RSD and a starting MD, and said ending node having an ending RSD and an ending MD, said starting node and ending node defining a strat block;
  (v) using said starting MD and said ending MD to obtain a plurality of target RSD values from said well bore, said plurality of target RSD values being obtained between said starting MD and said ending MD in said well bore, each of said target RSD values being associated with a target well log value;
  (vi) using said plurality of target RSD values to obtain a corresponding plurality of offset well log values from said offset well;
  (vii) calculating a value representative of a difference between said plurality of target well log values and said plurality of offset well log values, thereby calculating a distance between said starting node and said ending node;
  (viii) performing at least steps (iv) through (vii) until a plurality of distance values between a corresponding plurality of different starting and ending nodes has been calculated;
  (ix) using said plurality of distances to determine a minimum distance travel path through said plurality of different starting and ending nodes, said minimum distance travel path comprising a plurality of selected nodes in said node array, thereby determining a corresponding plurality of strat blocks;
  (x) using said plurality of strat blocks to determine the path with the target formation traveled by the horizontally drilled well;
 (b) using said the path within the target formation travelled by the horizontally drilled well to form a steering plan; and
 (c) controlling the trajectory of the horizontally drilled well to stay within the target formation according to the steering plan.

11. The method according to claim 10, wherein said offset well log and said target well log are both gamma logs.

12. The method according to claim 10, wherein step (i) comprises the steps of:
 (i1) accessing a typelog in an offset well, and
 (i2) normalizing at least a portion of said typelog, and, wherein step (ii) comprises the steps of:
  (ii1) accessing a target well log in the horizontally drilled well, and
  (ii2) normalizing at least a portion of said target well log.

13. The method according to claim 10, wherein step (i) comprises the steps of:
 (i1) accessing a typelog in an offset well, and
 (i2) numerically smoothing at least a portion of said typelog,
 and, wherein step (ii) comprises the steps of:
  (ii1) accessing a target well log in the horizontally drilled well, and
  (ii2) numerically smoothing at least a portion of said target well log.

14. The method according to claim 10, wherein step (g) comprises the step of:
 (viii) calculating a value representative of a difference between said plurality of target well log values and said plurality of offset well log values, thereby calculating a distance between said starting node and said ending node, wherein said value is calculated according to the equation $$D_{AB} = \sqrt{\sum_{i=1}^{n}(G(i)-T(i))^2},$$

where $D_{AB}$ is said value,

G(i), for i=1, n, is said plurality of offset well log values, n is a number of said G(i) values, and, T(i), for i=1,n, is said number of said type log values.

15. The method according to claim 10, wherein the step of using said plurality of distances to determine a minimum distance travel path through said plurality of different starting and ending nodes, is performed using Dijkstra's algorithm.

* * * * *